United States Patent [19]

Betton

[11] Patent Number: 4,533,016

[45] Date of Patent: Aug. 6, 1985

[54] ANTITHEFT IGNITION SYSTEM AND SOLENOID APPARATUS FOR USE THEREWITH

[75] Inventor: Arnold L. Betton, Reseda, Calif.

[73] Assignee: Phantom Systems, Inc., Van Nuys, Calif.

[21] Appl. No.: 541,866

[22] Filed: Oct. 14, 1983

[51] Int. Cl.³ .............................................. B60R 25/00
[52] U.S. Cl. ............................. 180/287; 307/10 AT; 340/64
[58] Field of Search ................... 307/10 AT; 340/64; 180/287, 286; 200/43

[56] References Cited

U.S. PATENT DOCUMENTS

| | | | |
|---|---|---|---|
| 3,543,040 | 12/1970 | Nemeth | 180/287 |
| 3,738,444 | 6/1973 | Roby | 180/287 |
| 4,159,467 | 6/1979 | Ballin | 180/287 |
| 4,209,709 | 6/1980 | Betton | 180/287 |
| 4,320,382 | 3/1982 | Roucek | 180/287 |
| 4,412,204 | 10/1983 | Pagane | 180/287 |

*Primary Examiner*—Richard A. Bertsch
*Attorney, Agent, or Firm*—Poms, Smith, Lande & Rose

[57] ABSTRACT

An antitheft ignition system and solenoid apparatus for use therewith in a motor vehicle having a starter motor energized therethrough by means of an ignition switch within the driver's compartment, the solenoid having a metal cannister housing with coils therein and an electronic circuit therein coded for operation in response to receipt of a predetermined series of pulses from the ignition switch for energizing the coils of the solenoid for enabling the starting of the motor of the vehicle. A circuit is provided within the solenoid for detecting the alternating current component of the battery voltage to sense an engine running condition.

19 Claims, 7 Drawing Figures

ANTITHEFT IGNITION SYSTEM AND SOLENOID APPARATUS FOR USE THEREWITH

BACKGROUND OF THE INVENTION

The background of the invention will be discussed in two parts:

FIELD OF THE INVENTION

This invention relates to ignition systems, and more particularly to a solenoid apparatus having antitheft ignition circuitry therein for use in a motor vehicle or the like.

DESCRIPTION OF THE PRIOR ART

Joyriding and theft of automobiles or other motor vehicles have resulted in substantial economic loss to the owners thereof. Although antitheft devices have been devised, professionals and even amateurs have become adept at overriding such devices and "hot-wiring" the vehicle for removal of the vehicle.

In conventional vehicles, two of the devices which require electrical energization for operation are the starter solenoid and the distributor. Electrical energy to the winding of the starter solenoid actuates the plunger thereof to close the circuit from the battery to the starter motor while simultaneously the solenoid plunger actuates a shift lever to force a pinion gear into meshing engagement with the flywheel to thereby mechanically rotate the engine, and initiate ignition. Electrical energy to the distributor, in turn, actuates the firing sequence of the spark plugs to thereby enable the engine to continue running. The thief bypasses the ignition switch to one of these devices to hot-wire the vehicle and with the engine thus running, the vehicle can be removed.

Attempts have been made to secure the vehicle by providing hood locks which are accessible only from the interior of the automobile, and further efforts have been made to secure the interior of the automobile by redesigning the window opening to protect against the insertion of wire for retracting the door lock. However, an individual intent on removing an automobile normally has little problem gaining access to the driver's compartment. Once access to the interior is obtained, the hood unlock lever can be actuated to gain access to the engine compartment for hot-wiring purposes.

Attempts have been made to provide armor cabling on certain electrical conductors within the engine compartment to preclude hot-wiring but such devices have not been entirely successful.

Electronic security ignition circuits have likewise been devised, such circuits, for example, being shown and described in U.S. Pat. Nos. 2,295,178; 2,620,387; 3,524,989; 3,543,040; 3,619,633; 3,675,035; 3,738,444; 3,784,839; 3,829,829, 3,956,732, and 3,973,641.

In such prior art devices, cabling or components are provided with armor or enclosures. In other circuits, additional wiring is provided to the driver compartment to enable the installation thereof. Because of the cabling, enclosure or additional wiring, a thief or joyrider will readily discern the addition of the device, thereby potentially enabling the individual to disarm or remove such added devices.

The ignition wiring on automobiles of more recent vintage passes down through the steering column, thus making them generally unavailable for ready modification. Furthermore, with the ignition switch mounted on the steering column, the switches and lock assemblies can be disabled and removed very quickly with a pair of pliers.

In U.S. Pat. No. 4,209,709, issued to Arnold L. Betton, the inventor of the instant application, there is shown and described an electronic ignition system in which electronic circuitry is located in an auxiliary metallic housing which is configured to surround both the solenoid and starter motor of the vehicle. The electrical interconnection between the circuitry and the solenoid are accomlished within the protection of the auxiliary housing, with a single wire leading from the housing to a point in the electrical circuitry for sensing the existence of alternator voltage.

The system provides for the circuit having a predetermined code encoded therein, with a sequence of momentary actuations of the ignition switch to the start position with intervening pauses providing a train of pulses for sensing by the circuit as a coded series of digits, each being representative of a number. If the digits provided by the train of pulses correspond to the encoded information, the circuit is enabled to provide energy to the solenoid coil. However, with different automobile manufacturers, the configuration of the solenoid and starter motors vary, and in some instances with the same model, the configuration vary from year to year, thus requiring an inordinately large number of different housings to be fabricated, thus inhibiting full commercial exploitation of the system.

It is an object of the present invention to provide a new and improved antitheft electronic ignition system.

It is another object of the present invention to provide a new and improved solenoid apparatus for use in an antitheft electronic ignition system.

It is a still further object of the present invention to provide a new and improved electronic circuit for enclosure within a solenoid housing with means for inhibiting actuation of the solenoid in the absence of entry of a predetermined code from the ignition switch of the vehicle.

It is still another object of the present invention to provide a new and improved electronic ignition system for a motor vehicle, the system having circuit means with a minimum standby current drain.

It is yet another object of the present invention to provide a new and improved circuitry for detecting the engine running condition by sensing the alternating current component of the battery voltage.

SUMMARY OF THE INVENTION

The foregoing and other objects of the invention are accomplished by providing a solenoid having a metal can-shaped housing for receiving at least one coil therein, the coil having disc-shaped washer members on opposite ends thereof, one of said washer members being configured for securing a microcircuit thereto, the microcircuit having connections to the one or more windings of the coil with processor means in the microcircuit being adapted for receiving a sequential pulse train caused by momentary actuations of the ignition switch with code means within the circuit being compared with the received pulses, and upon concurrence, enabling energization of the solenoid for starting the motor of the vehicle.

For enabling detection of the engine running condition, a unique circuit is provided for monitoring the alternating current component of the battery voltage caused by the voltage pulses that occur when the spark plugs fire. The engine running signal is used by the circuitry within the solenoid as a condition to setting the system.

Other objects, features and advantages of the invention will become apparent from a reading of the specification when taken in conjunction with the drawings, in which like reference numerals refer to like elements in the several views.

DESCRIPTION OF THE PREFERRED EMBODIMENT

Figure 1:
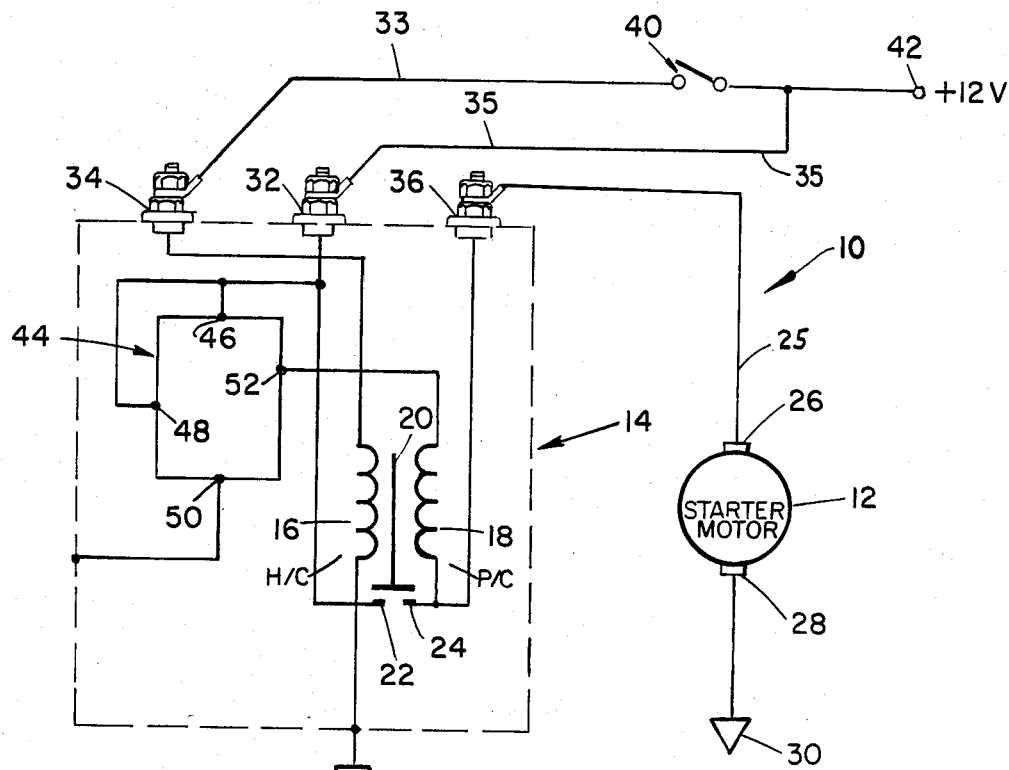
FIG. 1 is a diagrammatic view of the antitheft ignition system according to the invention.

Referring now to the drawings, and particularly to FIG. 1, there is shown diagrammatically an antitheft electronic ignition system 10 having a starter motor 12 energized through a solenoid apparatus, generally designated 14 (shown in dotted lines), the solenoid 14 having therein a first coil 16 and a second coil 18.

In FIG. 1, the coils 16 and 18 are shown side by side with a solenoid plunger 20 diagrammatically illustrated therebetween, actuation of the plunger 20 bridging the gap between the electrical contacts 22 and 24 to complete a circuit to the terminal 26 of the starter motor 12, the other terminal 28, of which, is normally connected to chassis ground 30. The solenoid 14 has first, second and third threaded stud terminals 32, 34 and 36, depicted on the upper periphery of the dotted block 14, with terminal 32 connected to contact 22 on the interior of the solenoid, and terminal connection 36 connected to contact 24 and extending out through the housing of the solenoid 14 for connection through lead 25 to terminal 26 of starter motor 12.

The terminal 32, which is the power terminal, is likewise connected to a source of power designated +12V, by means of the interconnecting lead 35. The other terminal 34 of the solenoid 14 is the "start" terminal which is connected via lead 33 to one contact of the ignition switch 40, the other contact of which is connected to the vehicle's source of power, such as battery 42 (designated +12V).

Within the metallic cannister housing of the solenoid 14, there is a microcircuit 44, which is a hybrid LSI chip having microprocessor means and a silicon-controlled rectifier. The chip is a four terminal device with the terminals being designated 46, 48, 50 and 52. Terminal 46 is the input terminal, terminal 48 is the terminal for connection to a voltage source, terminal 50 is the ground terminal and terminal 52 is the output terminal.

Briefly describing the components, the coil 16 of the solenoid 14 is referred to as a "holding" coil, and coil 18 is referred to as a "pull-in" coil. The hold coil 16 is connected between "start" terminal 34 and ground, as a consequence of which it is immediately energized as soon as the switch 40 is closed. With respect to the pull-in coil 18, in conventional solenoids, mechanical provision is made for the pull-in coil to be energized simultaneously with the hold coil, but to disconnect as soon as the plunger is actuated.

In the instant invention, the pull-in coil 18 is connected from a terminal 52 of the microcircuit 22 in series relation with the starter motor 12, the starter motor 12 typically having a very low resistance. The microcircuit 44 acts as a switchable controller for energizing the pull-in coil 18 only when the proper sequence of pulses has been entered, at which time, output terminal 52 approaches the +12 volts of the power supply.

In operation, after an output appears at the output terminal 52 of the microcircuit 44, and, with the ignition switch 40 closed (that is, rotated to the start position), both coils 16 and 18 will be energized, enabling the actuation of the plunger 20 to cause bridging of the contacts 22 and 24, thereby providing a closed circuit between the battery 42 and the terminal 26 of the starter motor 12. With power thus applied, the starter motor 12 is enabled to rotate. As will be discussed hereafter, the microcircuit 44 within solenoid 14 of the instant invention deactivates the pull-in coil 18 after actuation of the plunger 20. In a conventional solenoid having two coils such as coils 16 and 18, the unit is designed so that both coils need to be energized to actuate the plunger, such as plunger 20. Energization of the hold coil 16 alone will not actuate the plunger. However, once the plunger is actuated, only the "hold" coil 16 need be energized thereafter to maintain the plunger in its actuated position, that is, in the position bridging the starter contacts, such as contacts 22 and 24.

The microcircuit 44 of the present invention is an improved version of the circuitry of the aforementioned U.S. Pat. No. 4,209,709, issued to Arnold L. Betton, said patent being herein incorporated by reference. In said patent, a circuit was provided with means therein for establishing a predetermined code, with means therein receiving a sequential train of pulses from the ignition switch and comparing the received pulses against the code, with concurrence resulting in gating of a silicon-controlled rectifier in series with the coil of the solenoid. In said patent, a connection was made from the circuit to the alternator of the vehicle to provide an "engine run" signal, this connection requiring that a wire be run from the circuit to a point adjacent to the alternator for determining this condition.

In the circuit of the aforesaid patent, so long as the ignition switch was at the start position, current was flowing through the silicon-controlled rectifier (SCR), and through the hold coil of the solenoid, thus placing a burden on the SCR. In the present invention, as will be described, although there is an SCR in the circuit, the SCR is connected in series with the "pull-in" coil 18, which is only momentarily energized, with the main current for the solenoid 14 passing thereafter through the "hold" coil 16.

Figure 2:
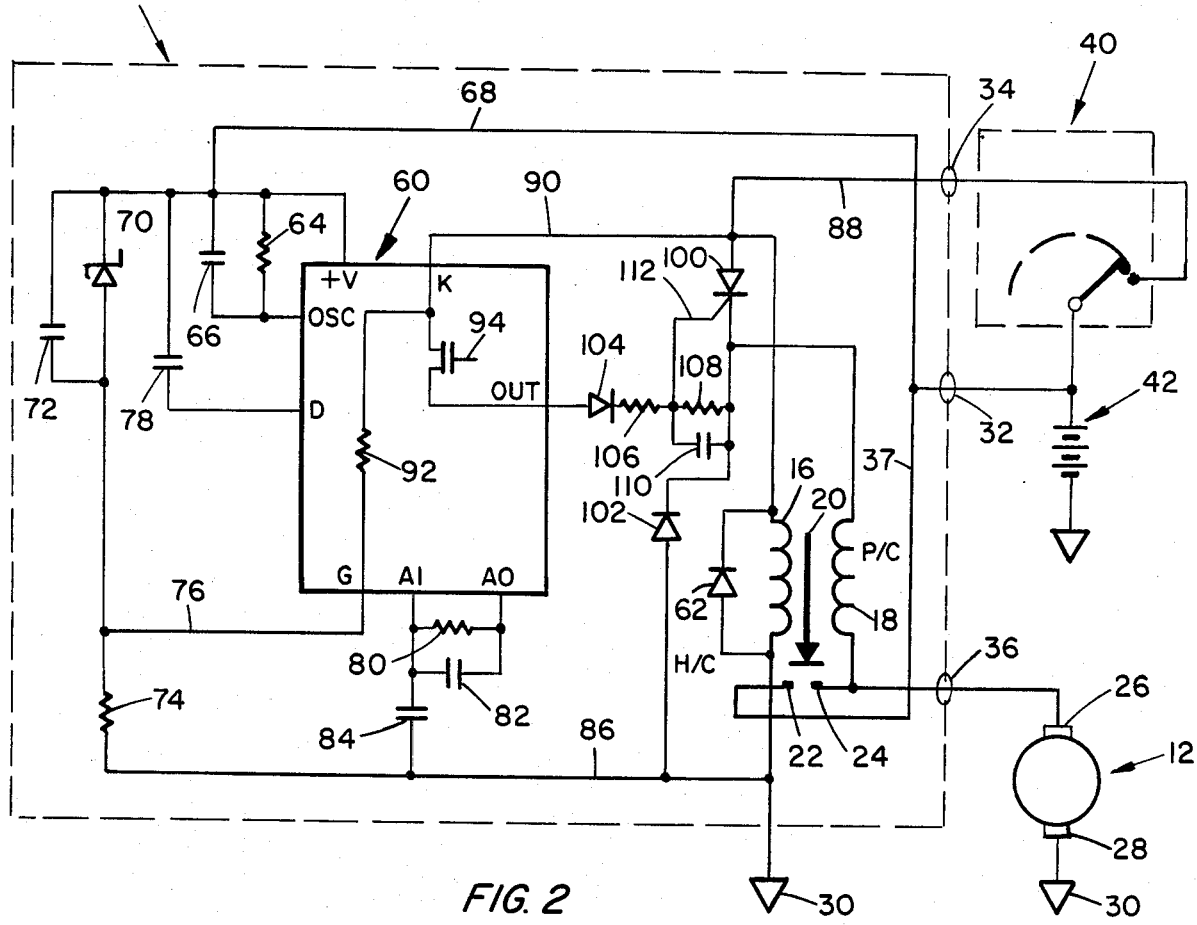
FIG. 2 is a partially schematic, partially diagrammatic view of the ignition system of FIG. 1.

Referring now to FIG. 2, the details pertaining to the circuitry will be described. In this figure, reference numerals have been utilized which correspond to the various points and terminals in the drawing of FIG. 1 for ease of explanation.

In FIG. 2, some of the details of the circuitry within the microcircuit 44 have been omitted for ease of discussion, and reference is required to the description of the invention of the aforementioned U.S. Pat. No. 4,209,709, which has been incoporated by reference. A detailed explanation of that circuit is not required for a full understanding of the instant invention, and the principles of operation from the user standpoint are the same. That is, if the system of the present invention is installed in a vehicle, and the system of the aforementioned patent is installed in another vehicle, to an operator, both systems would operate the same.

In FIG. 2, the enlarged rectangle is designated with the reference numeral 14 to depict the solenoid, with those components within the dotted line being those components contained within the solenoid of the present invention. A smaller dotted line box is shown in the upper right corner of the figure to depict the igntion switch 40 while the battery 42 and starter motor 12 are depicted therebelow.

The right side of the solenoid 14 has circles thereon at points where electrical leads exit, these points being designated 34, 32 and 36 to correspond to the three stud terminals of FIG. 1. Within the dotted rectangle depicting solenoid 14, there is a solid rectangular block, generally designated 60, block 60 representing a large scale integrated circuit (LSI) chip which has alterable non-volatile data storage. This type of storage is known as electrically erasable programmable read only memory (EEPROM), or non-volatile random access read/write memory (NVRAM).

The LSI chip 60 is part of the microcircuit 44, and contains processor means as well as storage to provide logic, control, timing and memory. Within the LSI chip 60, there are depicted a small number of electronic symbols corresponding to a few of the functions located on the chip. For a more detailed explanation of the microprocessor details reference may be had to the aforementioned Betton patent. The components within the LSI chip 60 are only those required for an explanation of the instant invention. The hybrid microcircuit 44 of FIG. 1 contains all of those electrical components symbolically depicted in the solenoid block 14 of FIG. 2 excepting only the coils 16 and 18, the diode 62 in parallel with the coil 16, the plunger 20 and the contacts 22 and 24.

Within the LSI chip 60 the various terminals thereof are labelled with the designations and interpretations as follows:

| | |
|---|---|
| K | key |
| +V | voltage |
| OSC | oscillator |
| D | doubler |
| G | ground |
| AI, AO | amplifier in, amplifier out |
| OUT | output |

Connected between the OSC and +V terminals is a parallel RC circuit consisting of resistor 64 and capacitor 66, this network determining the operating or clock frequency for the LSI chip 6. The +V terminal is likewise connected to the battery 42 via lead 68 through stud 32. For regulating the power supply to the LSI chip 60, the microcircuit 44 includes a Zener diode 70 in parallel with a capacitor 72, the components being connected in series with a resistor 74 between lead 68 and chassis ground 30. The point intermediate the resistor 74 and the parallel components is connected via lead 76 to the G terminal of the LSI chip 60. The component values are selected to provide the regulation necessary for proper operation of the LSI chip 60. A capacitor 78 is connected between the +V and D terminals of the LSI chip 60. In such LSI EEPROM or NVRAM chips, a voltage higher than battery voltage is required for performing nonvolatile erase and write operations. The chip 60 is provided with a voltage doubler circuit with the capacitor 78 being associated with that circuitry for providing the higher voltage required.

As described in the afortmentioned Betton patent 4,209,709, the system utilizes an "engine run" signal, which was accomplished in the system by running a wire from the circuit within the housing to the alternator to sense whether or not a voltage existed at the alternator terminal. In the instant invention, an "engine run" signal is provided, but it is detected differently. Rather than have a separate wire run to the alternator, the present system detects the "ripple" of the vehicle's power, which is caused by an alternating current (AC) component of the battery of the vehicle when the engine is running. When the motor is not running, the battery voltage is constant. Consequently, if one were to place the leads of an oscilloscope across the battery terminals with the engine not running, a straight line trace would appear on the scope. With the engine running, however, due to the alternating current component caused by both the alternator and the spark plugs firing, a ripple would appear on the trace.

Although the circuitry for the engine run detection will be described in detail later in conjunction with FIGS. 5 through 7, briefly, the LSI chip 60 contains an operational amplifier with the terminals AI and AO being the input and output, respectively. A parallel RC network of resistor 80 and capacitor 82 is connected between terminals AI and AO, with a capacitor 84 connected between terminal AI and chassis ground 30 over lead 86. This circuit senses the engine run condition utilized by the LSI chip 60. The component values are selected so that the ratio of the value of capacitor 82 to the value of capacitor 84 determines the gain of the operational amplifier, while the product of the value of resistor 80 and the value of capacitor 84 determines the low frequency response.

The movement of the ignition switch 40 is detected by means of the switch 40 being connected to the stud terminal 34 of solenoid 14, and internally to leads 88 and 90 to the K, or key terminal of the LSI chip 60. Within the LSI chip 60, the K terminal is connected in series with a high value resistance, depicted by resistor 92, the other end of which is connected to the G or ground terminal. The K terminal is likewise connected internally to the collector of a transistor device 94, the emitter of which is connected to the OUT, or output terminal of the LSI chip 60.

Within the LSI chip, when all conditions are met, that is, for example, when the proper code is entered, the transistor device 94 conducts, resulting in battery voltage, with a negligble loss through the transistor device 94, appearing at the OUT terminal of the LSI chip 60 when the switch 40 is actuated to the start position, that is with the switch 40 closed.

In accordance with the present invention, a silicon-controlled rectifier, or SCR 100 has the anode thereof connected to lead 88 for applying the battery voltage thereto with the ignition switch 40 closed. The cathode is connected first, to one end of the pull-in coil 18, and also to the cathode of diode 102, the anode of which is connected to chassis ground 30. The OUT terminal of the LSI chip 60 is connected to the anode of another diode 104 through series resistors 106 and 108 to the connecting point of the two cathodes of SCR 100 and diode 102. A capacitor 110 is connected in parallel with the resistor 108. The resistors 106 and 108 act as a voltage divider with the interconnecting point controlling the gate electrode of the SCR 100 over lead 112. The values and connections of the varius components such as diodes 102 and 104, resistors 106 and 108 and capacitor 110 are selected to provide the required control through the SCR 100. The diode 62 in parallel with hold coil 16 has the anode and cathode thereof so connected to act as a path for discharging the energy stored in the coil 16 after energization thereof.

Prior to a description of the operation of the circuit of FIG. 2, the system operation, as more completely set forth in the aforementioned Betton patent will be described briefly. If the system has not been set, the ignition system will behave as a conventional system, that is, the solenoid will be actuated upon movement of the ignition switch to the start position. In order to "arm" or set the system, the engine must be running, and the ignition switch is momentarily actuated a predetermined number of times to the start position. The number of actuations required is determined by the password or code to which the system responds.

For example, in accordance with the description in the aforementioned patent, if the first two digits of the four digit password or code are 7 and 2, the system is set with the engine running, by momentarily actuating the ignition switch seven times, followed by a pause and then momentarily actuating the switch two times, after which the ignition switch may be turned to the off position. This action sets a system latch which disables the device from providing an output until the proper password has been entered via the switch.

If, as described in the patent, the entire code or password is represented by the sequence of digits 7-2-2-2, then to enable the starting of the vehicle, seven pulses are entered into the system by actuating the ignition switch seven times to the start position, followed by a pause of about one second. Assuming the intervals between actuations are less than the one second, the system will recognize this series of pulses as the first "word" or digit, with the pause of one second distinguishing between words. The operator then enters the next two pulses for the second word or digit, followed by a one second pause, and so on, until all four digits have been entered, and after a one second pause the switch may be moved to the start position and held for energizing the solenoid.

To the operator having a motor vehicle with the ignition system of FIG. 2, the operation will be the same. The operator has a password, has means for setting the system by actuation of the ignition switch with the engine running, and has the means for actuating the system once set by entering the password, as described. However, as previously described, the system of the present invention differs in material respects which will now be described.

Assuming the system of FIG. 2 has not been set, transistor device 94 will be conducting. The system latch hereinabove referred to will be contained within the LSI chip 60 and will effectively control the base of the transistor device 94, that is with the latch set, transistor device 94 will be off, and conversely if the system latch has not been set, transistor device 94 will conduct.

In this mode, the system will act as a conventional ignition system, that is, when the operator moves the ignition switch 40 to the start position, a circuit is completed from the battery 42 through the switch 40 over leads 88 and 90 to provide a voltage to the K terminal of the LSI chip 60. With transistor device 94 conducting, this voltage appears at the OUT terminal to be applied through diode 104 and resistor 106 to the gate electrode of the SCR 100, thereby rendering SCR 100 conductive.

Upon initial movement of the switch 40 to the start position, hold coil 16 is immediately energized from lead 88 to chassis ground 30, and with SCR 100 conductive, pull-in coil 18 is energized with current passing through SCR 100, through coil 18 in series therewith, through solenoid terminal 36 and thence through the windings of the starter motor 12 to chassis ground 30. The resistance of the windings of the motor 12 is low compared to the resistance of the pull-in coil 18, as a consequence of which approximately full voltage will be applied to the pull-in coil 18.

With both coils 16 and 18 thus energized, the combined strength of the field thus created will actuate the solenoid plunger 20 downwardly, as viewed in FIG. 2, to bridge the contacts 22 and 24, and thereby provide a direct connection of the battery 42 to the starter motor 12.

This connection is from the positive pole of battery 42 through solenoid terminal 32 over lead 37 through contacts 22 and 24 through solenoid terminal 36 to the starter motor 12 to chassis ground 30. As soon as the contacts 22 and 24 are bridged, the voltage appearing at that point is battery 42 source voltage. Simultaneously, due to the conduction of the SCR 100, the voltage appearing at the cathode thereof is battery source voltage.

Since the pull-in coil 18 is connected between these two points, that is the anode of SCR 100 and contact 24, and since the voltage at these two points is the same, there is no voltage difference across the pull-in coil, and thus no current drain through the SCR 100. Allowing for the normal sequence of events, the SCR 100 conducts current for approximately 3 to 5 milliseconds maximum for each time the starter is actuated regardless of how long the switch 40 is held in the start position. This equates to an average power dissipation through SCR 100 of less than 100 milliwatts for each starter actuation. Consequently, elaborate heat sink provisions are not required, thus enabling the system to be compact.

Once the engine of the vehicle is running, this condition will be sensed by the "engine run" detection at AI and AO of the LSI chip 60 by means of the ripple detection via capacitors 82 and 84 and resistor 80. With the engine running and with the switch 40 momentarily actuated the required number of times as determined by the password, the operational amplifier within the LSI chip 60 will enable setting of the system latch, which will in turn, control the transistor devide 94 to the non-conductive state. With device 94 non-conductive no voltage appears at the gate electrode of SCR 100, thereby precluding energization of pull-in coil 18.

Once the system has been set, the system latch will be set, and transistor device 94 will be non-conductive. As the pulses corresponding to the digits of the password are entered, the actuations of the switch 40 are sensed at the K terminal of the LSI chip 60. Although the internal construction of the chip 60 is not shown in detail, the circuitry will correspond to that shown in the Betton patent. After entry of the correct sequence of pulses, the system latch will be actuated to its other state, thereby rendering transistor device 94 conductive, whereupon subsequent actuation and holding of the ignition switch 40 will apply energy to the two coils 16 and 18 as heretofore described.

Figure 3:
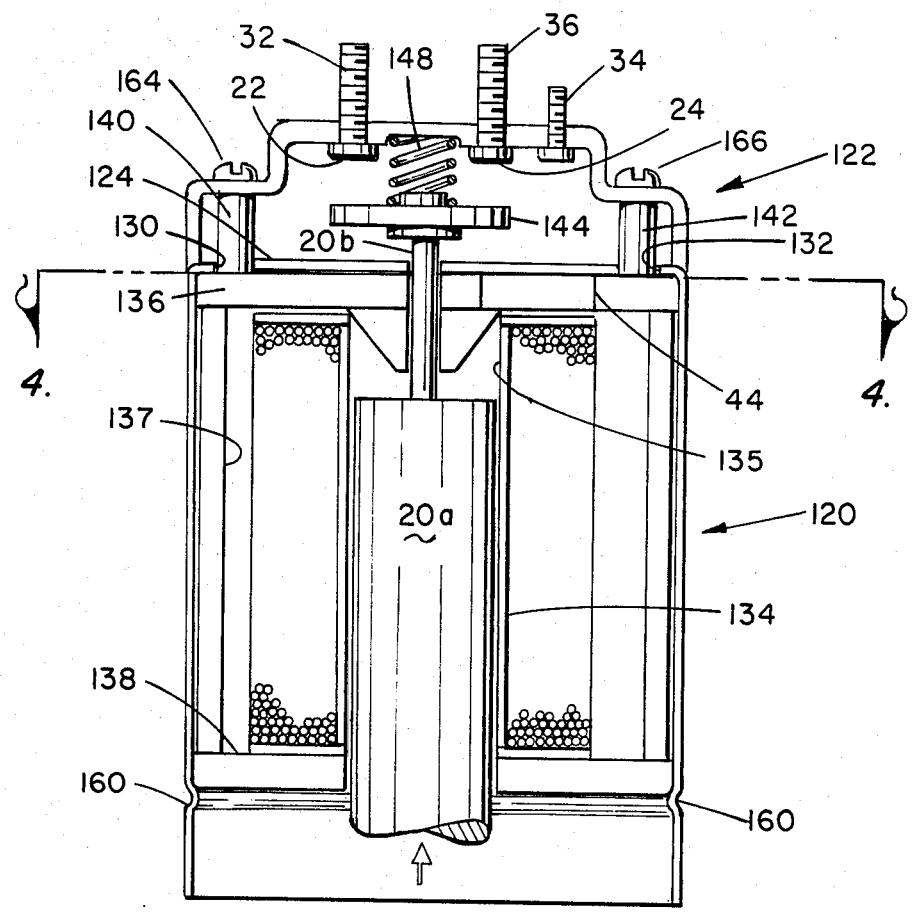
FIG. 3 is a side elevational cross-sectional view of the solenoid apparatus of the invention.
Figure 4:
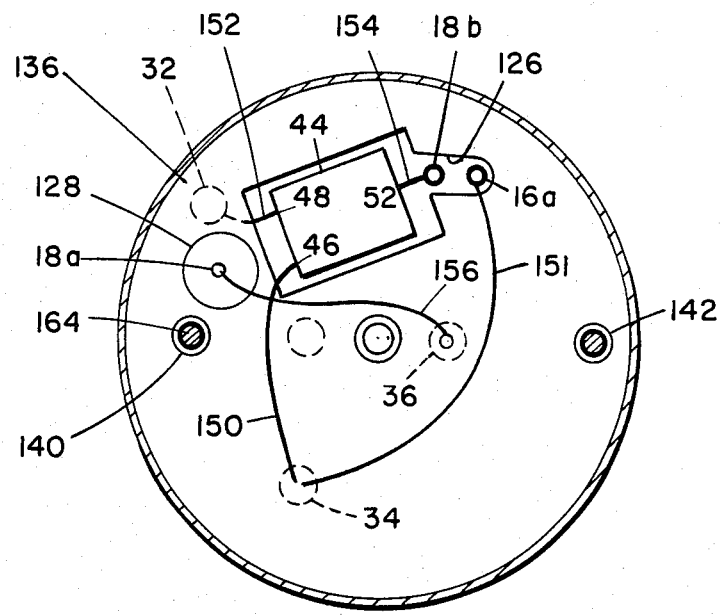
FIG. 4 is a plan view of the upper washer assembly of the solenoid apparatus of FIG. 3 as viewed generally along line 4—4 thereof.

Referring now to FIGS. 3 and 4, the details pertaining to the construction of the solenoid apparatus will be described. The solenoid 14 includes a housing 120 and a cap portion 122, the housing 120 being a con-shaped metallic housing, and the cap 122 being molded of a suitable phenolic substance. The stud terminals 32, 34 and 36 are suitably bonded to the insulating material of the cap 122 during the forming thereof to provide electrical connection to the solenoid component, with electrical insulation. The stud terminals 32 and 36 are of larger diameter than the terminal 34, since the stud terminals 32 and 36 are configured for carrying the starter motor current which may typically be 150 to 500 amperes. Terminal 34 only carries the current required for the coils 16 and 18, which is typically very low by comparison. The closed end 124 of the housing 120 is provided with suitable openings in general alignment with the openings 126 and 128 of the upper washer 136 for passage therethrough of the leads required for connection to the terminals 32, 34 and 36 of the cap 122. In addition the closed end 124 contains first and second diametrically opposed apertures 130 and 132 through which pass threaded standoffs 140 and 142 for attachment of the parts.

The coils 16 and 18 are formed of insulated wire wound about a spool 134, the spool 134 then being sandwiched between two disc shaped washers 136 and 138, with a compression sleeve 137 therebetween. One end of the hold coil 16 is suitably connected to the metal spool 134 to effect the grounding of this coil (see also FIG. 1). The upper washer 136 (see FIGS. 4 and 5) has secured thereto the two standoffs 140 and 142, which have threaded apertures therein for receiving the screws which pass through the cap 122 for assembling the unit. The spool 134 is formed of metal for aid in generating the electromagnetic field and has a central opening 135 into which the solenoid plunger 20 (only a portion of which is shown) is inserted. Although the plunger 20 has been symbolically illustrated as one piece bridging the contacts 22 and 24 in FIGS. 1 and 2, in fact there are two components, the main plunger, designated 20a, and the bridge contactor designated 20b. The bridge contactor 20b is formed of conductive material such as brass, and resembles a mushroom with a disc top 144 (which actually bridges the contacts 22 and 24) and a stem portion 146, which is moved against the force of the coil spring 148 when the main plunger 20a is drawn into the opening 135 of the spool 134 upon energization of the coils 16 and 18. The disc top 144 is connected to the stem portion 146 in such a manner to provide insulation therebetween.

As illustrated in FIG. 4, the opening 126 of the top washer 136 has been enlarged sufficiently for receiving the microcircuit 44, the circuit 44 being packaged in a thickness less than the thickness of the washer 136 (see also FIG. 3). The chip 44 is configured for having the ground path thereof leading to a metal surface on the chip, which is then electrically bonded, such as by soldering or spot welding to the washer 136 to provide the necessary connection to chassis ground. By reference to FIG. 1, this connection would correspond to the connection from terminal 50 on the microcircuit 44.

A second connection from the microcircuit 44 is designated by lead 150 and extends to a dotted circle designated 34, this corresponding to the connection from terminal 46 in FIG. 1 to the stud or start terminal 34. Another lead 151 interconnects the terminal 34 with one wire from the coils extending out of opening 126. A third connection from microcircuit 44 in FIG. 4 is effected via lead 152 which connects to the stud terminal 32, this corresponding in FIG. 1 to the connection from terminal 48 of the microcircuit. The fourth connection from the microcircuit 44 is by means of lead 154, which is connected to one of the wires leading out of opening 126, this particular wire being designated 18b and corresponding to one end of the winding for coil 18.

The two wire ends in opening 126 of the washer 136 are designated 16a and 18b, corresponding to one end of the winding of coil 16 and one end of the winding of coil 18 respectively. The wire end extending out of opening 128 is designated 18a, corresponding to the other end of coil 18, this end being connected by means of lead 156 to stud terminal 36.

In the construction of the solenoid, the microcircuit 44 is secured to the enlarged portion of the opening 126, and suitably electrically bonded to provide a ground connection for the four terminal device. The three remaining leads are suitably bent for leading out through the openings in the closed end 124 of cannister or housing 120, these openings being the same openings through which pass the wire ends 16a, 18a and 18b. The washer 136 is then mounted atop the spool 134 which has the windings thereon, the compression sleeve 137 is assembled about this and the lower washer 138 is placed on the bottom of spool 134. The assembled parts are then inserted into the cannister or housing 120, with the various leads of the microcircuit 44 and the coil ends 16a, 18a and 18b, extending out through the openings in the closed end 124 of the housing 120. The standoffs 140 and 142 pass through aligned openings in the closed end 124 of the housing 120 during this operation and serve to align the assembly within the housing 120.

Pressure is then applied to the lower washer 138 and the sides of the housing 120 crimped as indicated at 160 to retain the parts therein. In this manner all of the circuitry is not only contained wihin the solenoid 14, but is securely contained within the metal housing 120 thereof. The various leads of the microcircuit and the two coils are then suitably electrically secured, such as by soldering, to the inner ends of stud terminals 32, 34 and 36, and to each other, as required, in accordance with the wiring diagram of FIG. 1.

The top cover 122 is then fastened such as by means of screws 164 and 166 passing through apertures therein into threaded engagement with the standoffs 140 and 142 to fasten the cover 122 to the housing 120. The assembled solenoid apparatus 14, complete with antitheft ignition system protection contained therein, is then ready for installation in a motor vehicle with no external wiring required, thus providing no visible indication to a thief or joyrider of the existence of the system. It is to be understood that while some solenoids are constructed differently, the solenoid described is generally the industry standard approach.

Figure 5:
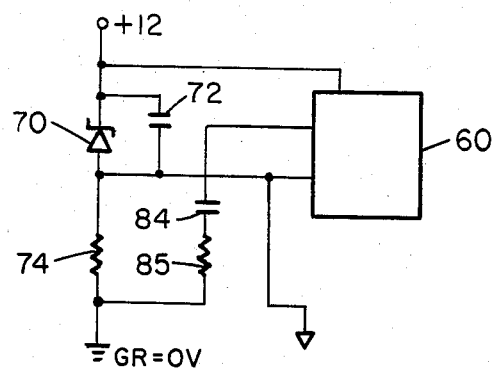
FIG. 5 is a modified schematic diagram of the circuitry of FIG. 2.
Figure 6:
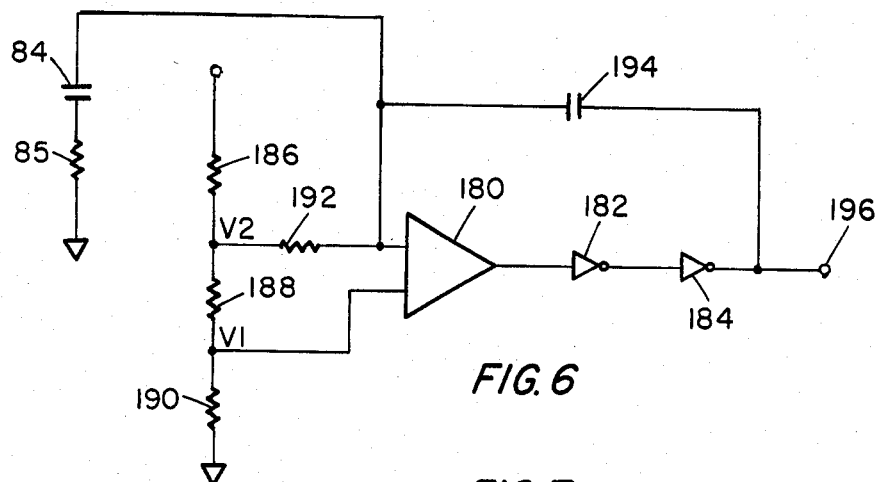
FIG. 6 is a schematic diagram of the engine running condition sensing section of circuitry usable in the systems of FIGS. 2 and 5.
Figure 7:
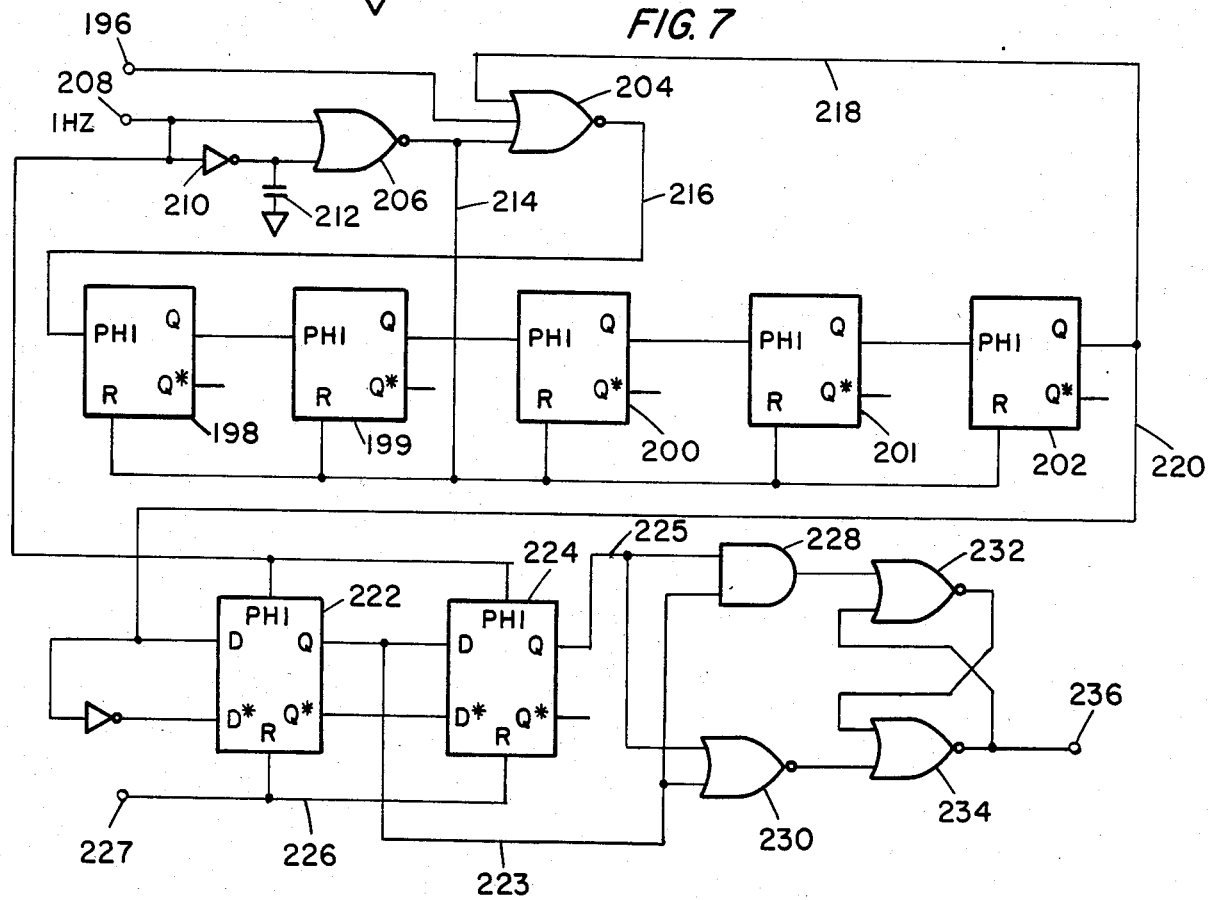
FIG. 7 is a logic diagram depicting a digital frequency discriminator used in conjunction with the circuitry of FIG. 6.

Referring now to FIGS. 5 through 7, the details pertaining to the engine run detector will now be described. Although the description herein will proceed with reference to the ignition system of the subject invention, it is to be understood that the circuitry to be described may be used in any system utilizing a source of direct current, such as a battery, with an alternating component selectively superimposed thereon, such as in a battery charging system by use of an internal combustion engine, wherein it is desired to sense the latter condition with the alternating current component.

FIG. 5 depicts a modified version of the schematic of FIG. 2 wherein the Zener diode 70, resistor 74 and capacitor 72 correspond to those shown in FIG. 2. The enlarged block 60 corresponds to the LSI chip 60 in FIG. 2. The capacitor 84 corresponds to the capacitor 84 at the AI input of the LSI chip 60 in FIG. 2, and a resistor 85 in series therewith has no counterpart in FIG. 2. Capacitor 84 is part of a sensing circuit which is used as an alternating current input of the battery A.C. voltage component. The resistor 85 is not important to normal circuit operation, but serves the function of limiting current during high voltage transient conditions which may exist during vehicle operation.

FIG. 6 depicts circuitry contained within the LSI chip 60, and includes the operational amplifier 180 previously mentioned. The operational amplifier 180 has a non-inverting input (designated with a +) and an inverting input (designated with a −), with the output thereof passing through serially arranged inverters 182 and 184, which are used to improve the output impedance of the amplifier 180.

The non-inverting input thereof is connected to the input AI that is, electrically connected to capacitor 84 for sensing the voltage activity at the capacitor 84. For biasing purposes, a voltage bridge consisting of resistors 186, 188 and 190 is provided on the chip 60 and connected between the chip positive voltage source and chip ground. At the point intermediate the resistors 186 and 188, a resistor 192 is connected with the other end thereof connected to the non-inverting input of the amplifier 180. The point intermediate resistors 188 and 190 is directly coupled to the inverting input of amplifier 180. These bias points are respectively designated $V_1$ and $V_2$, with $V_1$ being about 150 millivolts lower than the bias voltage $V_2$. The voltage difference between $V_2$ and $V_1$ and the connections shown at the input of the amplifier 180 causes the amplifier to function as a negative threshhold discriminator.

In contrast, the ignition noise, i.e., perturbations on the battery voltage during vehicle operation, is positive when measured on the positive battery terminal relative to vehicle ground. The power supply circuitry shown in FIG. 5 gives the LSI chip 60 a positive ground, so the additional voltage appears as a negative pulse. Only if the AC input quickly goes more negative than the differential between $V_2$ and $V_2$ will the amplifier output go negative. Thus, all input signals sensed at the capacitor 84 of insufficient amplitude are ignored. In addition, the value of capacitor 84 and the value of the resistor 192 are selected to form a high pass filter, which ignores slow moving signals such as those caused by electric motors or by the transistion to a new voltage equilibrium after switching a direct current load in or out. If a fast negative going pulse having an amplitude in excess of the differential between $V_2$ and $V_1$ appears at the non-inverting input of amplifier 180, the output goes negative.

A positive feedback loop is provided with capacitor 194 connected between the output apearing at the output of the second inverter 184 and the non-inverting input, with this positive feedback pushing the voltage at the non-inverting input even further negative. This action disables acknowledgement of another pulse for a time equal to twice the time it takes to decay back to voltage $V_1$. In order, first the voltage at the non-inverting input decays back to $V_1$, then the amplifier 180 switches and the capacitor 194 pushes the voltage at the non-inverting input more positive than the value of voltage $V_2$, then the value of the voltage appearing at the non-inverting input decays back to the value of voltage $V_2$. This aspect of the circuitry limits the output frequency of the amplifier 180 and the detector or sensing circuitry. As a consequence, a near balanced input condition cannot result in a pulse burst of a frequency higher than the source signal. With the sensing circuitry as described, it senses the voltage pulse that occurs when a spark plug is firing and ignores other battery noise that arises from operation of the alternator and various accessories. The distinguishing characteristics of the spark plug firing pulse are amplitude, frequency, polarity and rise/fall time. The circuit thus described provides for sensing these distinguishing characteristics to provide a full swing digital signal at point 196 (the output of inverter 184) ready for further digital processing to provide the "engine running" signal needed for operation of the system.

The signal appearing at point 196, by reference to FIG. 7, is then provided to a digital counter to determine if the frequency of the fast negative pulses is high enough to be caused by a running engine. The counter is essentially a five stage retriggerable flip-flop arrangement consisting of flip-flops 198–202 which count the pulses for a period of one second. The logic circuitry in FIG. 7 is contained within the LSI chip 60 previously described. The point 196 is connected to one input of a three input NOR gate, a second input of which is received from the output of a two input NOR gate 206. One input of the NOR gate 206 is received from a 1 HZ signal generated within the LSI chip 60, this input point being designated 208. This signal at point 208 is inverted through inverter 210 to provide the second input to the NOR gate 206, with a capacitor 212 connected between the input and ground for maintaining the input for a given time thereafter.

The output of the NOR gate 206 provides a "reset" signal to the flip-flops 198–202 over lead 214. The output of NOR gate 204 is connected over lead 216 to the input of the first flip-flop 198, with the "Q" output thereof providing the input to the next flip-flop 199, the output of which provides the input to the next flip-flop 200, and so on through the next two flip-flops 201 and 202. The output of the last flip-flop in the counter is coupled to the third input of the NOR gate 204 over lead 218, and over lead 220 to the "D" input of the first bistable flip-flop 222 of a two bit shift register, which also includes a second bistable flip-flop 224. The inverse of the input is provided to the "D*" input of the flip-flop 222, which has the "Q" and "Q*" outputs coupled to the "D" and "D*" inputs of the flip-flop 224.

The "reset" input to both flip-flops is connected over lead 226 to point 227 which receives a digital signal indicative of an "engine cranking" condition, the purpose of which will be discussed hereafter. The "Q" outputs of the two flip-flops 222 and 224 serve as the two inputs to an AND gate 228, and simultaneously as the two inputs of a NOR gate 230. The output of the AND gate 228 provides a first input to NOR gate 232, while the output of NOR gate 230 provides a first input to a NOR gate 234, the outputs of NOR gates 232 and 234 being cross-coupled back to the input of the other NOR gate. The output of NOR gate 234 provides a signal at point 236 which is the signal indicative of the "engine running" condition.

In operation, briefly, the counter arrangement consisting of flip-flops 198–202 counts pulses for a period of one second, as measured by the 1HZ enabling signal at point 208, during which time the outputs of the successive flip-flops are enabled until the last flip-flop 202 goes "high", with this condition being sensed over lead 218 to disable the NOR gate 204 from passing further pulses from point 196 therethrough, thus stopping the count. After one second, the state of the "Q" output of the flip-flop 202 is loaded into the two-bit latch, and the counter is reset over lead 214. If the shift register has both outputs equal, these outputs are transferred over leads 223 and 225 to the inputs of both the AND gate 228 and the NOR gate 230, with NOR gates 232 and 234 receiving the appropriate outputs to provide a "high" signal at point 236, thereby indicating the "engine running" condition.

If the engine is cranking, that is if the starter motor has been actuated, it is desirable, although not necessary, to provide a disabling signal to the circuitry shown in FIG. 7 to ignore any spurious pulses or transients occasioned by the starter motor actuation. This signal is provided at point 227, which provides a reset input to both flip-flops 222 and 224 of the two bit shift register over lead 226. By reference also to FIG. 2, this signal may conveniently be derived from the gate voltage appearing on lead 112 at the cathode of the SCR 100, which is conductive only when the solenoid pull-in coil 18 has current passing therethrough. In this manner, the shift register flip-flops 222 and 224 have the outputs thereof driven "low", as a consequence of which the "engine running" condition signal appearing at point 236 is held "low".

Although not shown, the frequency discrimination of the pulses appearing at point 196 may be accomplished by use of analog techniques, if desired. However in the preferred embodiment, the digital technique shown and described is preferred, consistent with the chip fabrication techniques employed.

Although the circuitry shown in FIGS. 5 through 7 have been described in conjunction with the anti-theft ignition system of the present invention, it is to be understood that the circuitry may have utility independently on the particular system, and may be used in conjunction with other existing ignition systems or as a control signal for selectively controllable devices within a vehicle or the like, the actuation of which is desired only when the engine is running.

While there has been shown and described a preferred embodiment, it is to be understood that various other adaptations and modifications may be made within the spirit and scope of the invention.

I claim:

1. In a device for use with a vehicle or the like having a direct current power source for use in starting an internal combustion engine, the combination comprising:
    controllable means on said vehicle controllable only with said engine running; and
    sensing means for sensing an alternating current component superimposed on the direct current source with said engine running for providing a signal to said controllable means for enabling actuation thereof.

2. The combination according to claim 1 wherein said controllable means is an electronic ignition system settable for disabling starting of the engine.

3. The combination according to claim 1 wherein said sensing means includes frequency discrimination means for sensing the pulses superimposed on said direct current source by the firing of the sparkplugs of the engine.

4. The combination according to claim 3 wherein said sensing means further includes means for counting said pulses for a predetermined time period.

5. The combination according to claim 2 wherein said internal combustion engine includes a direct current operated starting motor, and said sensing means further includes means for inhibiting an output signal from said sensing means so long as said starter motor is running.

6. The combination according to claim 5 wherein said electronic ignition system includes means for detecting successive actuations of ignition switch means indicative of a predetermined code, proper receipt of which enables actuation of a solenoid for enabling actuation of said starter motor.

7. The combination according to claim 6 wherein said ignition system includes means for setting the system only in response to the existence of said signal from said sensing means.

8. The combination according to claim 1 wherein said sensing means includes means for discriminating between pulses and means for counting only those pulses having fast rise and fall times indicative of firing spark plugs.

9. The combination according to claim 1, wherein said vehicle has an ignition switch operable to a closed position for actuating a solenoid having a plunger and first and second coils therein with the energization of both coils being required for the actuation of the plunger thereof, additionally comprising:
    means for connecting one of said coils between the ignition switch and vehicle ground;
    said controllable means adapted for receiving pulses from actuations of said ignition switch;
    said controllable means having semiconductor means operable in response to receipt by said controllable means of a predetermined sequence of actuations of said ignition switch, said semiconductor means being electrically connected to the other of said coils for energizing the same; and
    said controllable means having means for deenergizing said other coil after actuation of said plunger of the solenoid, whereby said semiconductor means is operable for only a short duration during starting of the vehicle.

10. The combination according to claim 9 wherein said solenoid has a housing and said controllable means are contained within the housing of the solenoid.

11. The combination according to claim 9 wherein said controllable semiconductor means is a silicon controlled rectifier.

12. The combination according to claim 9 wherein said controllable means further includes means for selectively setting said controllable means in response to actuation of said ignition switch with the engine of the vehicle running.

13. In a solenoid apparatus for use in a motor vehicle having a power source, an ignition switch, and a starter motor, the combination comprising:
    a solenoid housing;
    a spool within said housing having wound thereon first and second coils;

circuit means within said housing, said circuit means having controllable semiconductor means and control means;

first terminal means on said solenoid housing for connection to the power course of said vehicle, second terminal means on said solenoid housing for connection to the starter motor of said vehicle and third terminal means on said solenoid housing for connection to the ignition switch of said vehicle;

plunger means at least partially insertable within said spool for axial movement in response to electrical energization of both said first and second coils;

contact means actuated by actuation of said plunger means for electrically interconnecting said first and second terminal means to complete a circuit from the power source of the vehicle to the starter motor thereof;

means within said housing for connecting said control means of said circuit means to said third terminal means;

means within said housing for connecting said first coil between said third terminal means and ground;

means within said housing for connecting the input of said circuit means to said third terminal means for sensing closures of said ignition switch, said control means being responsive to a predetermined sequence of closures for enabling said controllable semiconductor means; and means for connecting said controllable semiconductor means to one end of said second coil, the other end of said second coil being connected to said third terminal means for deenergizing said second coil in response to actuation of said plunger.

14. The combination according to claim 13 wherein said housing includes a metallic portion and said circuit means are contained within said metallic portion.

15. The combination according to claim 14 wherein said circuit means are contained on a single chip.

16. The combination according to claim 15 wherein said metallic portion is a metallic cannister, first and second washer members are positioned on opposite ends of said spool, and the components are retained within said cannister by crimping of the surface thereof.

17. The combination according to claim 16 wherein said circuit means is mounted on one of said washer members.

18. The combination according to claim 13 wherein said controllable semiconductor means is a silicon controlled rectifier.

19. The combination according to claim 13 wherein said circuit means includes means for setting said circuit means for selective operation thereof, said means for setting being responsive to actuations of said ignition switch with the engine of the motor vehicle running, and said circuit means further includes means for detecting that the engine is running.

* * * * *